United States Patent
Mednik et al.

(10) Patent No.: US 10,284,095 B1
(45) Date of Patent: May 7, 2019

(54) METHOD AND APPARATUS FOR PHASE CURRENT BALANCING IN MULTI-PHASE CONSTANT ON-TIME BUCK CONVERTER

(71) Applicant: Microchip Technology Incorporated, Chandler, AZ (US)

(72) Inventors: Alexander Mednik, Campbell, CA (US); Ioan Stoichita, Campbell, CA (US); Surya Talari, Santa Clara, CA (US)

(73) Assignee: Microchip Technology Incorporated

( * ) Notice: Subject to any disclaimer, the term of this patent is extended or adjusted under 35 U.S.C. 154(b) by 0 days.

(21) Appl. No.: 16/003,369

(22) Filed: Jun. 8, 2018

Related U.S. Application Data

(60) Provisional application No. 62/632,230, filed on Feb. 19, 2018.

(51) Int. Cl.
*H02M 3/158* (2006.01)
*H02M 1/08* (2006.01)
*H02M 1/00* (2006.01)
*H02J 1/10* (2006.01)
*G05F 3/30* (2006.01)
*G05F 1/56* (2006.01)

(52) U.S. Cl.
CPC .......... *H02M 3/1584* (2013.01); *H02M 1/08* (2013.01); *G05F 1/56* (2013.01); *G05F 3/30* (2013.01); *H02J 1/102* (2013.01); *H02M 2001/0009* (2013.01); *Y02B 70/1466* (2013.01)

(58) Field of Classification Search
CPC ........ H02M 3/10; H02M 3/155–3/158; H02M 3/1584; H02M 3/1588; H02J 1/102; Y02B 70/1466; G05F 3/30; G05F 3/262; G05F 3/265
USPC ....... 323/272, 274, 275, 277, 282, 290, 312, 323/315
See application file for complete search history.

(56) References Cited

U.S. PATENT DOCUMENTS

| | | | | |
|---|---|---|---|---|
| 5,493,205 A | * | 2/1996 | Gorecki | G05F 3/262 323/315 |
| 8,724,355 B1 | * | 5/2014 | Pinkhasov | H02M 7/217 323/315 |

* cited by examiner

*Primary Examiner* — Yemane Mehari
(74) *Attorney, Agent, or Firm* — Burr & Forman LLP; Jeffrey H. Kamenetsky

(57) ABSTRACT

A multi-phase DC-to-DC buck converter for receiving an input voltage and delivering an output voltage to a load by splitting the load current between a plurality of DC-to-DC buck converter cells. The converter includes a plurality of current sense circuits for sensing current in a respective converter cell, each of the current sense circuits configured to generate a respective current sense signal, an averaging circuit for receiving each of the respective current sense signals and generating an average signal, a plurality of imbalance detector circuits for comparing a respective current sense signal with the average signal and generating a respective current imbalance signal, and a plurality of ON time generators for activating a converter cell for a predetermined time interval and altering the predetermined time interval in accordance with a time integral of a respective current imbalance signal.

17 Claims, 4 Drawing Sheets

METHOD AND APPARATUS FOR PHASE CURRENT BALANCING IN MULTI-PHASE CONSTANT ON-TIME BUCK CONVERTER

CROSS-REFERENCE TO RELATED APPLICATION

This application claims the benefit of U.S. Provisional Patent Application No. 62/632,230, filed on Feb. 19, 2018, which is incorporated herein by reference in its entirety.

TECHNICAL FIELD

The present disclosure generally relates to constant ON time converters and more particularly to a method and apparatus for achieving output current balance between phases.

BACKGROUND

In a multi-phase DC-DC power converter, balance between currents in all phases needs to be considered. Imbalance in output current between phases can cause uneven heat distribution, which adversely affects performance, power efficiency, and size of the power converter. It must be recognized that pulse-width modulation (PWM) control of multiple continuous conduction-mode (CCM) power converters configured to share a common load will not necessarily achieve sharing the output current equally between these converters. A consideration should be taken in the control method to achieve the current balance between phases.

Ripple-based constant ON time (COT) converters have been popular for their exceptionally fast response to load transients, inherent control simplicity and stability. Numerous schemes have been proposed for achieving output current balance between phases by altering the ON time of a phase in proportion with the deviation of its current from the average of all phases. FIG. 1 depicts an example of such a prior-art COT converter, wherein the inductor current of each of N converter cells 11, $IL_1 \sim IL_N$, is monitored by a current sense circuit 101 and compared by an imbalance detector circuit 105 to an average current of all N phases derived by the averaging circuit 102 after passing low-pass filters 103. The resulting imbalance voltage, $\Delta V_{CS1} \sim \Delta V_{CSN}$, is subtracted from a ramp threshold voltage $V_{O(est)}$ of an ON time generator 107 at a summing node 106. The threshold voltage $V_{O(est)}$ is typically generated in proportion with the output voltage $V_O$, whether actual, or estimated, and the ramp current is generated in proportion with the input voltage $V_{IN}$ of the power converter to maintain constant switching period Ts at all operating conditions.

Another scheme includes altering the $T_{ON}$ signal in each individual phase in proportion with the imbalance signal.

Due to the presence of significant switching ripple component in the inductor current, low-pass filters 103 are required to achieve current balancing. These filters affect the current balancing loop dynamics and, therefore, degrade the load transient response.

SUMMARY

According to one aspect of the present disclosure, a multi-phase DC-to-DC buck converter for receiving an input voltage and delivering an output voltage to a load by splitting the load current between a plurality of DC-to-DC buck converter cells is provided. The converter includes a plurality of current sense circuits each configured to sense current in a respective one of the plurality of converter cells, each of the plurality of current sense circuits configured to generate a respective current sense signal; an averaging circuit configured to receive each of the respective current sense signals and generate an average signal, a plurality of imbalance detector circuits each configured to compare a respective current sense signal with the average signal and generate a respective current imbalance signal, and a plurality of ON time generators each configured to activate a respective one of the plurality of converter cells for a predetermined time interval and to alter the predetermined time interval in accordance with a time integral of a respective current imbalance signal.

In one embodiment of this aspect, each of the plurality of ON time generators includes a source of predetermined current, a timing capacitor configured to integrate a sum of the predetermined current and a respective current imbalance signal and generate a ramp voltage; and a comparator for terminating the altered predetermined time interval upon the ramp voltage exceeding a threshold. In another embodiment, the predetermined current is substantially proportional to the input voltage. In another embodiment, the threshold is substantially proportional to the output voltage.

In another embodiment, the converter further includes a plurality of transconductor circuits, wherein each of the plurality of transconductor circuits is configured to transform a respective current imbalance signal to current. In another embodiment, the converter further includes a plurality of multiplier-divider circuits, wherein each of the plurality of multiplier-divider circuits is configured to multiply a respective current imbalance signal by a ratio of the input voltage and the output voltage, and to generate a normalized current imbalance signal, wherein a respective one of the plurality of ON time generators alters the predetermined time interval in accordance with a time integral of a respective normalized current imbalance signal.

In another embodiment, the converter further includes a plurality of multiplier circuits, wherein each of the plurality of multiplier circuits is configured to multiply a respective current imbalance signal by a duty cycle of a respective one of the plurality of DC-to-DC buck converter cells and to generate a normalized current imbalance signal, wherein a respective one of the plurality of ON time generators alters the predetermined time interval in accordance with a time integral of a respective normalized current imbalance signal. In another embodiment, each of the plurality of multiplier-divider circuits includes a corresponding transconductor circuit, wherein each corresponding transconductor circuit is configured to transform a respective current imbalance signal to current.

According to another aspect of the disclosure, a method, in a multi-phase DC-to-DC buck converter, for receiving an input voltage and delivering an output voltage to a load by splitting the load current between a plurality of DC-to-DC buck converter cells is provided. The method includes sensing current in a respective one of the plurality of converter cells and generating a respective current sense signal, receiving each of the respective current sense signals and generating an average signal, comparing a respective current sense signal with the average signal and generating a respective current imbalance signal, and activating a respective one of the plurality of converter cells for a predetermined time interval and altering the predetermined time interval in accordance with a time integral of a respective current imbalance signal.

In one embodiment of this aspect, the method further includes integrating a sum of a predetermined current and a respective current imbalance signal and generating a ramp voltage, and terminating the altered predetermined time interval upon the ramp voltage exceeding a threshold. In another embodiment, the predetermined current is substantially proportional to the input voltage. In another embodiment, the threshold is substantially proportional to the output voltage.

In another embodiment, the method further includes transforming a respective current imbalance signal to current. In another embodiment, the method further includes multiplying a respective current imbalance signal by a ratio of the input voltage and the output voltage, generating a normalized current imbalance signal, and altering the predetermined time interval in accordance with a time integral of a respective normalized current imbalance signal.

In another embodiment, the method further includes multiplying a respective current imbalance signal by a duty cycle of a respective one of the plurality of DC-to-DC buck converter cells, generating a normalized current imbalance signal, and altering the predetermined time interval in accordance with a time integral of a respective normalized current imbalance signal.

According to another aspect of the present disclosure, a multi-phase DC-to-DC buck converter for receiving an input voltage and delivering an output voltage to a load by splitting the load current between a plurality of DC-to-DC buck converter cells is provided. The converter includes a plurality of current sense circuits each configured to sense current in a respective one of the plurality of converter cells, each of the plurality of current sense circuits configured to generate a respective current sense signal, an averaging circuit configured to receive each of the respective current sense signals and generate an average signal, a plurality of imbalance detector circuits each configured to compare a respective current sense signal with the average signal and generate a respective current imbalance signal, a plurality of transconductor circuits, wherein each of the plurality of transconductor circuits is configured to transform a respective current imbalance signal to current, a plurality of multiplier-divider circuits, wherein each of the plurality of multiplier-divider circuits is configured to multiply a respective current imbalance signal by a ratio of the input voltage and the output voltage, and to generate a normalized current imbalance signal, and a plurality of ON time generators each configured to activate a respective one of the plurality of converter cells for a predetermined time interval and to alter the predetermined time interval in accordance with a time integral of a respective normalized current imbalance signal. Each of the ON time generators includes a source of predetermined current, a timing capacitor configured to integrate a sum of the predetermined current and a respective current imbalance signal and generate a ramp voltage, and a comparator for terminating the altered predetermined time interval upon the ramp voltage exceeding a threshold.

According to another aspect of the present disclosure, a multi-phase DC-to-DC buck converter for receiving an input voltage and delivering an output voltage to a load by splitting the load current between a plurality of DC-to-DC buck converter cells, is provided. The converter includes a plurality of current sense circuits each configured to sense current in a respective one of the plurality of converter cells, each of the plurality of current sense circuits configured to generate a respective current sense signal, an averaging circuit configured to receive each of the respective current sense signals and generate an average signal, a plurality of imbalance detector circuits each configured to compare a respective current sense signal with the average signal and generate a respective current imbalance signal, a plurality of transconductor circuits, wherein each of the plurality of transconductor circuits is configured to transform a respective current imbalance signal to current, a plurality of multiplier circuits, wherein each of the plurality of multiplier circuits is configured to multiply a respective current imbalance signal by a duty cycle of a respective one of the plurality of DC-to-DC buck converter cells, and to generate a normalized current imbalance signal, and a plurality of ON time generators each configured to activate a respective one of the plurality of converter cells for a predetermined time interval and to alter the predetermined time interval in accordance with a time integral of a respective normalized current imbalance signal. Each of the ON time generators includes a source of predetermined current, a timing capacitor configured to integrate a sum of the predetermined current and a respective current imbalance signal and generate a ramp voltage, and a comparator for terminating the altered predetermined time interval upon the ramp voltage exceeding a threshold.

BRIEF DESCRIPTION OF DRAWINGS

A more complete understanding of the present embodiments, and the attendant advantages and features thereof, will be more readily understood by reference to the following detailed description when considered in conjunction with the accompanying drawings wherein.

DETAILED DESCRIPTION OF EXEMPLARY EMBODIMENTS

Figure 2:
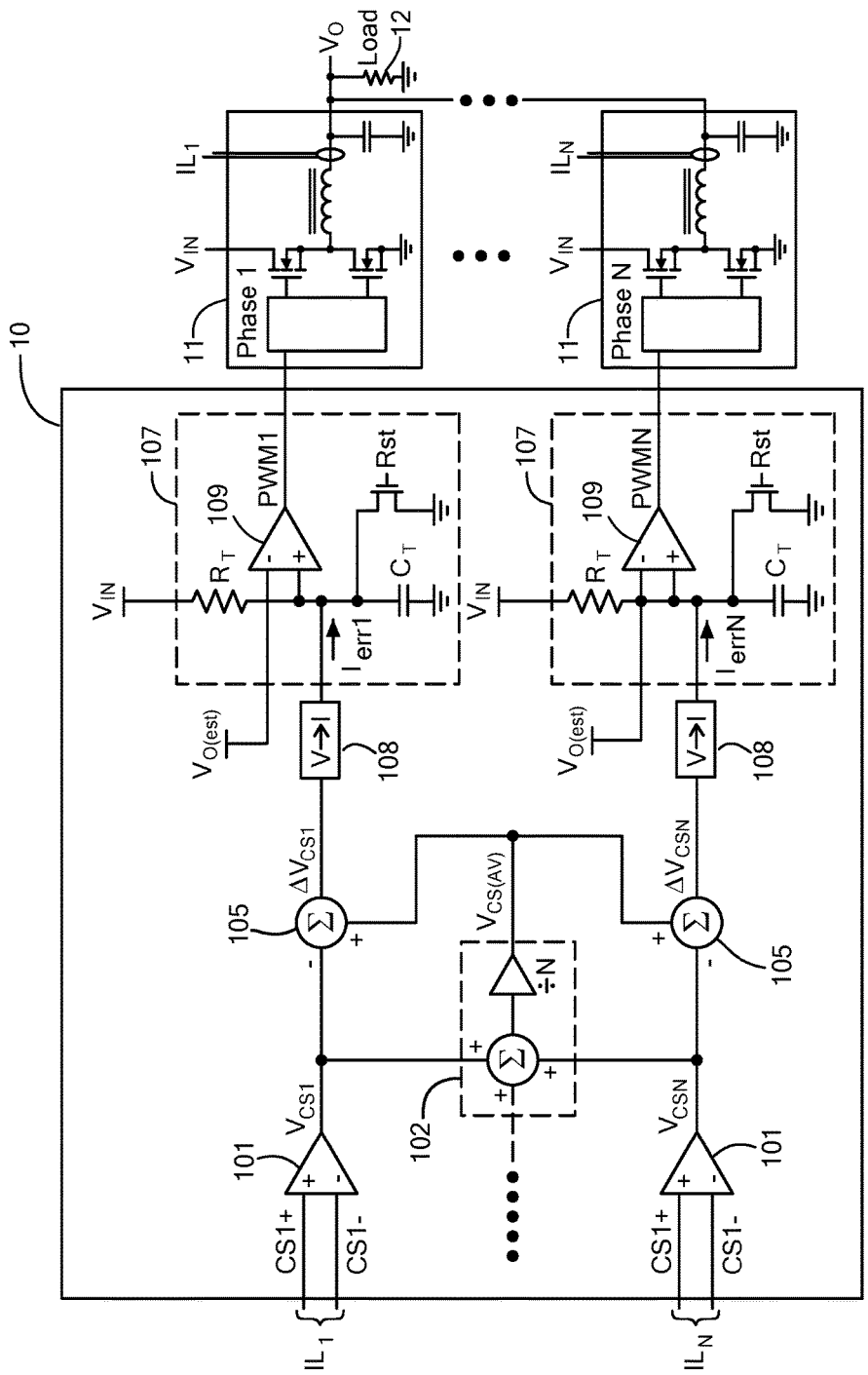
FIG. 2 is a circuit diagram of a multi-phase DC-to-DC buck converter in accordance with the principles of the present disclosure.

FIG. 2 illustrates an exemplary embodiment of the multi-phase DC-to-DC COT buck converter of the present disclosure. Buck converter of FIG. 2 is configured to receive an input voltage $V_{IN}$ and deliver an output voltage $V_O$ to a load 12 by splitting the load current between a plurality of DC-to-DC buck converter cells 11. In this embodiment, the buck converter includes a multi-phase COT controller 10. The COT controller 10 includes current sense circuits 101, each of which monitors the inductor current of each of N converter cells 11, $IL_1$~$IL_N$. Each of the current sense circuits 101 is configured to generate a respective current sense signal, $V_{CS1}$~$V_{CSN}$. The COT controller 10 further includes an averaging circuit 102 configured to receive the current sense signals $V_{CS1}$~$V_{CSN}$ and generate an average signal $V_{CS(AV)}$. The COT controller 10 further includes current imbalance detector circuits 105 each configured to compare a respective current sense signal $V_{CS1}$~$V_{CSN}$ with the average signal $V_{CS(AV)}$ and generate a respective current imbalance signal $\Delta V_{CS1}$~$\Delta V_{CSN}$.

The COT controller 10 also includes ON time generators 107, each configured to activate a respective one of converter cells 11 for a fixed ON time and to alter the fixed ON time in accordance with a time integral of a respective current imbalance signal $\Delta V_{CS1}$~$\Delta V_{CSN}$. In one embodiment, each of the ON time generators 107 includes a source of fixed current, a timing capacitor $C_T$ configured to integrate a sum of the fixed current and a respective current imbalance signal $\Delta V_{CS1}$~$\Delta V_{CSN}$ and to generate a PWM ramp voltage, and a comparator 109 for terminating the altered fixed ON time upon the ramp voltage exceeding a given threshold voltage, e.g., $V_{O(est)}$. In one embodiment, the fixed current is substantially proportional to the input voltage $V_{IN}$. In another embodiment, the threshold is substantially proportional to the output voltage $V_O$.

Figure 1:
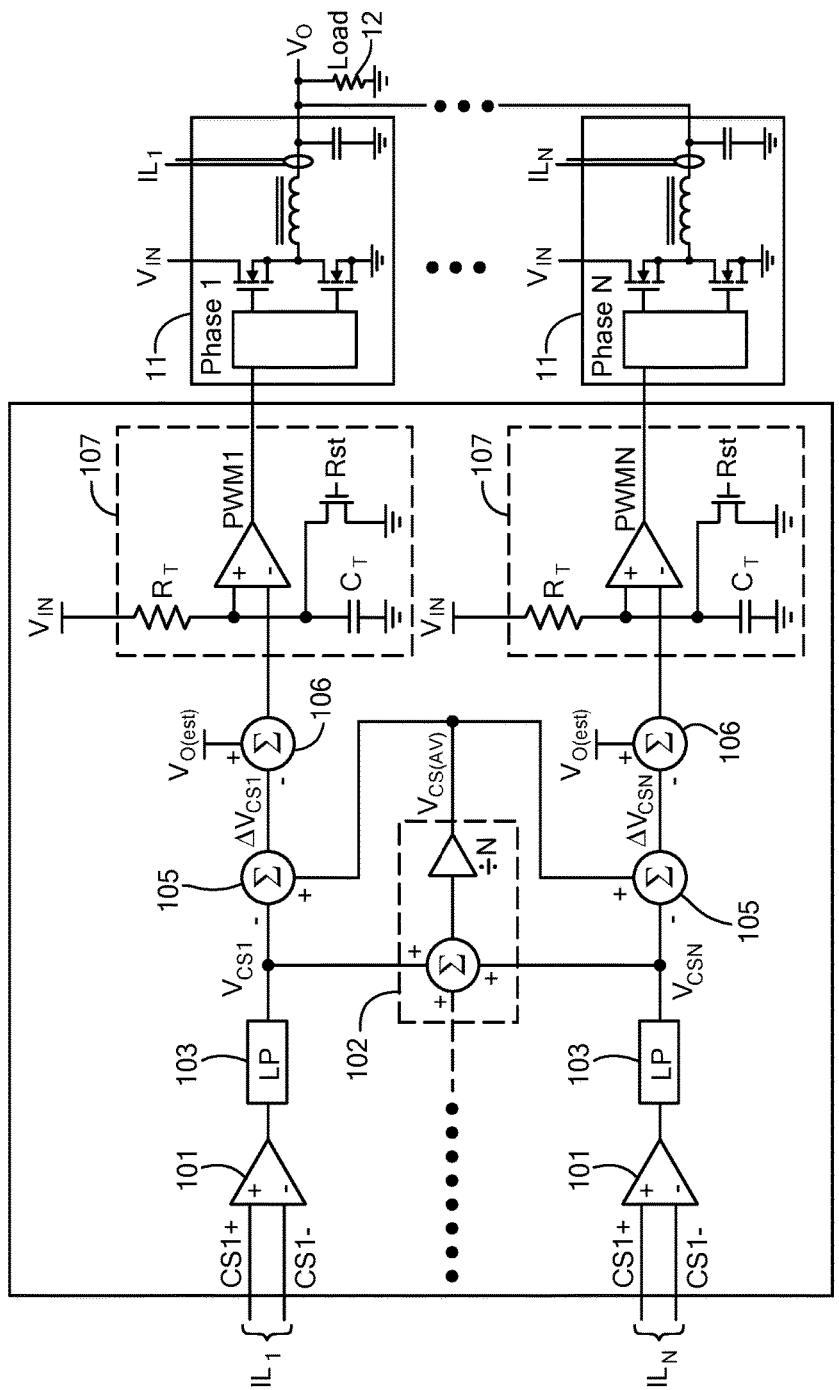
FIG. 1 is a circuit diagram of a prior art multi-phase DC-to-DC buck converter.

In one embodiment, as shown in FIG. 2, as an improvement to the prior art COT converter of FIG. 1, the current imbalance signal, $\Delta V_{CS1}$~$\Delta V_{CSN}$, is converted to current, $I_{err1}$~$I_{errN}$, using transconductor circuits 108, and summed with the fixed current of the ON time generator 107 at its timing capacitor $C_T$. Advantageously, integration of current $I_{err1}$~$I_{errN}$ negates the effect of the ripple current component, and the filters 103 shown in the prior art converter of FIG. 1 can be eliminated, resulting in an improved load transient response.

The current imbalance signal, $\Delta V_{CS1}$~$\Delta V_{CSN}$, is integrated at the capacitor $C_T$ over the ON time interval only, rather than being integrated over the entire switching cycle. Therefore, in one embodiment, the current balancing loop of the converter shown in FIG. 2 may require normalization of the loop gain with respect to $V_{IN}$ and $V_O$.

Figure 3:
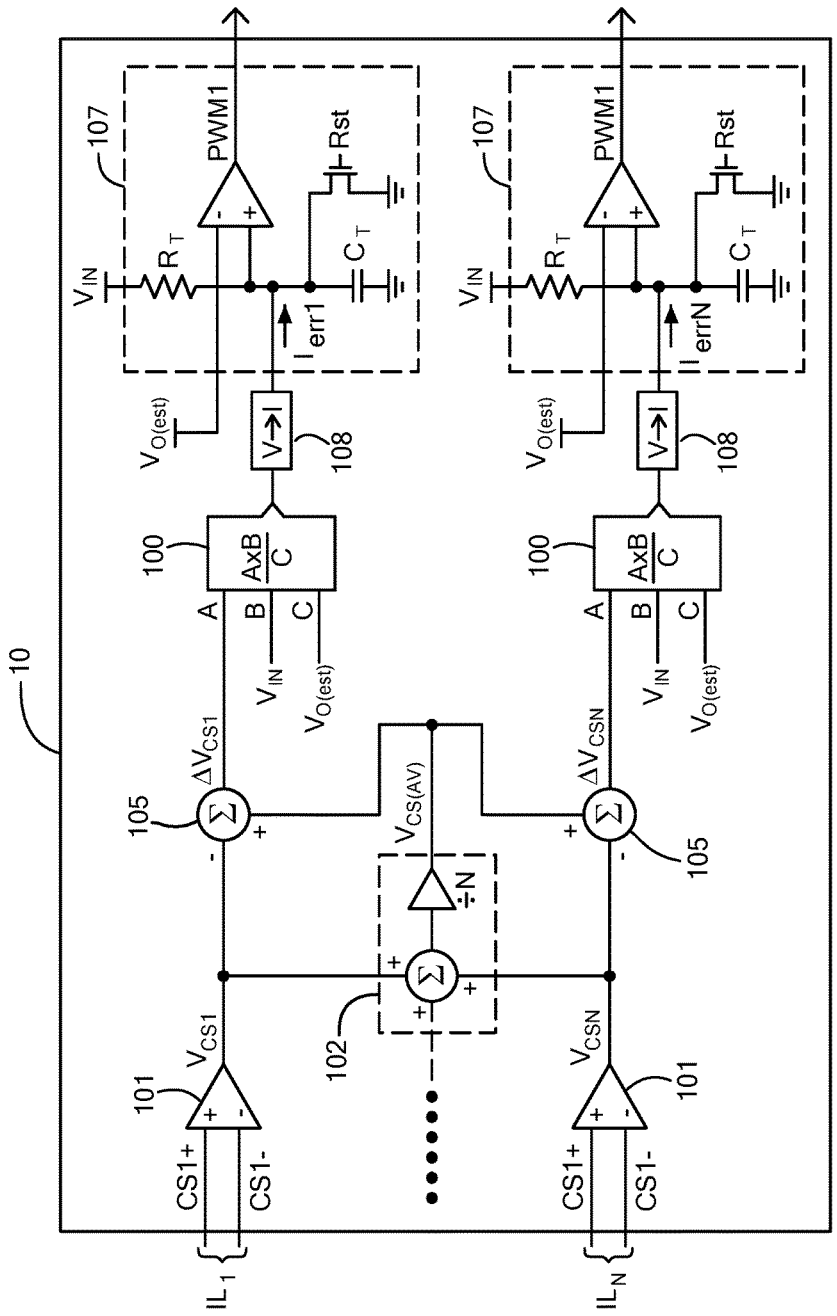
FIG. 3 is a COT controller of the present disclosure comprising a multiplier-divider circuit configured to normalize the current balancing loop gain of the multi-phase buck converter.

FIG. 3 illustrates an exemplary embodiment of a COT controller 10 of the present disclosure in accordance with this requirement. The COT controller 10 shown in FIG. 3 additionally includes a multiplier-divider circuit 100 normalizing the current balancing loop gain of the multi-phase DC-DC COT buck converter. The resulting gain of the current balancing loop is invariant with respect to $V_{IN}$ and $V_O$.

Thus, in this embodiment, the COT controller 10 of the present disclosure may include multiplier-divider circuits 100, wherein each of the multiplier-divider circuits 100 is configured to multiply a respective current imbalance signal, i.e., $\Delta V_{CS1}$~$\Delta V_{CSN}$ by a ratio of the input voltage and the output voltage, and to generate a normalized current imbalance signal. Thus, each one of the ON time generators 107 alters the fixed ON time in accordance with a time integral of a respective normalized current imbalance signal.

Figure 4:
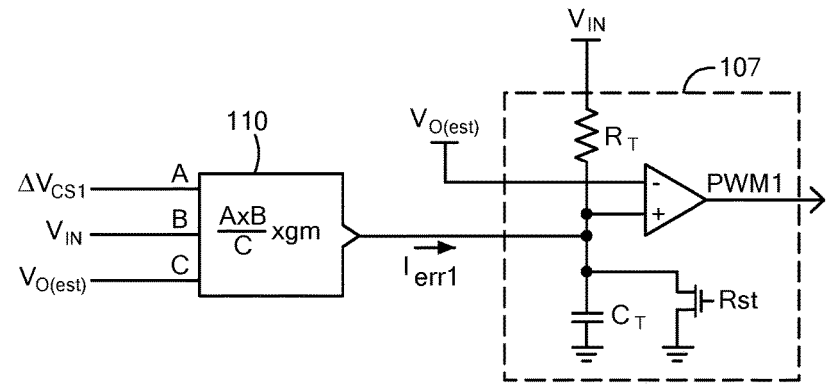
FIG. 4 is an alternate embodiment of the multiplier-divider circuit of the present disclosure configured to normalize the current balancing loop gain of the multi-phase buck converter.

In FIG. 4, an alternate embodiment of the multiplier-divider circuit 100 of FIG. 3 is illustrated. In this embodiment, multiplier-divider circuit 100 and transconductor 108 are combined into one element, i.e. a variable-gain transconductor 110.

Figure 5:
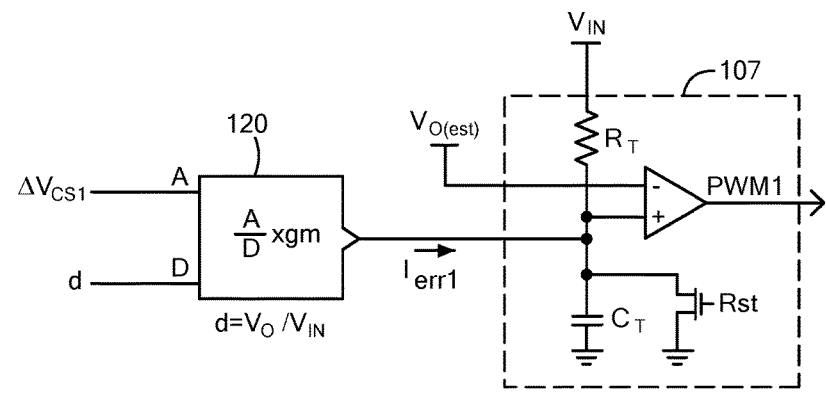
FIG. 5 is yet another embodiment of the present disclosure where a multiplier circuit is configured to normalize the current balancing loop gain of the multi-phase buck converter.

In FIG. 5, in another embodiment, a multiplier circuit 120 is configured to multiply a respective current imbalance signal by a duty cycle d of a respective DC-to-DC buck converter cell 11 and to generate a normalized current imbalance signal. Thus, each ON time generator 107 alters the predetermined time interval in accordance with a time integral of a respective normalized current imbalance signal as generated by multiplier circuit 120. As in the embodiment shown in FIG. 4 with respect to multiplier-divider circuit 110, multiplier circuit 120 is a variable gain transconductor.

Many different embodiments have been disclosed herein, in connection with the above description and the drawings. It will be understood that it would be unduly repetitious to literally describe and illustrate every combination and sub-combination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A multi-phase DC-to-DC buck converter for receiving an input voltage and delivering an output voltage to a load by splitting the load current between a plurality of DC-to-DC buck converter cells, the converter comprising:
   a plurality of current sense circuits each configured to sense current in a respective one of the plurality of converter cells, each of the plurality of current sense circuits configured to generate a respective current sense signal;
   an averaging circuit configured to receive each of the respective current sense signals and generate an average signal;
   a plurality of imbalance detector circuits each configured to compare a respective current sense signal with the average signal and generate a respective current imbalance signal; and
   a plurality of ON time generators each configured to activate a respective one of the plurality of converter cells for a predetermined time interval and to alter the predetermined time interval in accordance with a time integral of a respective current imbalance signal.

2. The converter of claim 1, wherein each of the plurality of ON time generators comprises:
   a source of predetermined current;
   a timing capacitor configured to integrate a sum of the predetermined current and a respective current imbalance signal and generate a ramp voltage; and
   a comparator for terminating the altered predetermined time interval upon the ramp voltage exceeding a threshold.

3. The converter of claim 2, wherein the predetermined current is substantially proportional to the input voltage.

4. The converter of claim 2, wherein the threshold is substantially proportional to the output voltage.

5. The converter of claim 2, further comprising a plurality of transconductor circuits, wherein each of the plurality of transconductor circuits is configured to transform a respective current imbalance signal to current.

6. The converter of claim 1, further comprising:
   a plurality of multiplier-divider circuits, wherein each of the plurality of multiplier-divider circuits is configured to multiply a respective current imbalance signal by a ratio of the input voltage and the output voltage, and to generate a normalized current imbalance signal, wherein a respective one of the plurality of ON time generators alters the predetermined time interval in accordance with a time integral of a respective normalized current imbalance signal.

7. The converter of claim 1, further comprising:
a plurality of multiplier circuits, wherein each of the plurality of multiplier circuits is configured to multiply a respective current imbalance signal by a duty cycle of a respective one of the plurality of DC-to-DC buck converter cells and to generate a normalized current imbalance signal, wherein a respective one of the plurality of ON time generators alters the predetermined time interval in accordance with a time integral of a respective normalized current imbalance signal.

8. The converter of claim 6, wherein each of the plurality of multiplier-divider circuits includes a corresponding transconductor circuit, wherein each corresponding transconductor circuit is configured to transform a respective current imbalance signal to current.

9. A method in a multi-phase DC-to-DC buck converter for receiving an input voltage and delivering an output voltage to a load by splitting the load current between a plurality of DC-to-DC buck converter cells, the method comprising:
sensing current in a respective one of the plurality of converter cells and generating a respective current sense signal;
receiving each of the respective current sense signals and generating an average signal;
comparing a respective current sense signal with the average signal and generating a respective current imbalance signal; and
activating a respective one of the plurality of converter cells for a predetermined time interval and altering the predetermined time interval in accordance with a time integral of a respective current imbalance signal.

10. The method of claim 9, further comprising:
integrating a sum of a predetermined current and a respective current imbalance signal and generating a ramp voltage; and
terminating the altered predetermined time interval upon the ramp voltage exceeding a threshold.

11. The method of claim 10, wherein the predetermined current is substantially proportional to the input voltage.

12. The method of claim 10, wherein the threshold is substantially proportional to the output voltage.

13. The method of claim 10, further comprising transforming a respective current imbalance signal to current.

14. The method of claim 9, further comprising:
multiplying a respective current imbalance signal by a ratio of the input voltage and the output voltage to generate a normalized current imbalance signal; and
altering the predetermined time interval in accordance with a time integral of a respective normalized current imbalance signal.

15. The method of claim 9, further comprising:
multiplying a respective current imbalance signal by a duty cycle of a respective one of the plurality of DC-to-DC buck converter cells to generate a normalized current imbalance signal; and
altering the predetermined time interval in accordance with a time integral of a respective normalized current imbalance signal.

16. A multi-phase DC-to-DC buck converter for receiving an input voltage and delivering an output voltage to a load by splitting the load current between a plurality of DC-to-DC buck converter cells, the converter comprising:
a plurality of current sense circuits each configured to sense current in a respective one of the plurality of converter cells, each of the plurality of current sense circuits configured to generate a respective current sense signal;
an averaging circuit configured to receive each of the respective current sense signals and generate an average signal;
a plurality of imbalance detector circuits each configured to compare a respective current sense signal with the average signal and generate a respective current imbalance signal;
a plurality of transconductor circuits, wherein each of the plurality of transconductor circuits is configured to transform a respective current imbalance signal to current;
a plurality of multiplier-divider circuits, wherein each of the plurality of multiplier-divider circuits is configured to multiply a respective current imbalance signal by a ratio of the input voltage and the output voltage, and to generate a normalized current imbalance signal; and
a plurality of ON time generators each configured to activate a respective one of the plurality of converter cells for a predetermined time interval and to alter the predetermined time interval in accordance with a time integral of a respective normalized current imbalance signal;
each of the ON time generators comprising:
a source of predetermined current;
a timing capacitor configured to integrate a sum of the predetermined current and a respective current imbalance signal and generate a ramp voltage; and
a comparator for terminating the altered predetermined time interval upon the ramp voltage exceeding a threshold.

17. A multi-phase DC-to-DC buck converter for receiving an input voltage and delivering an output voltage to a load by splitting the load current between a plurality of DC-to-DC buck converter cells, the converter comprising:
a plurality of current sense circuits each configured to sense current in a respective one of the plurality of converter cells, each of the plurality of current sense circuits configured to generate a respective current sense signal;
an averaging circuit configured to receive each of the respective current sense signals and generate an average signal;
a plurality of imbalance detector circuits each configured to compare a respective current sense signal with the average signal and generate a respective current imbalance signal;
a plurality of transconductor circuits, wherein each of the plurality of transconductor circuits is configured to transform a respective current imbalance signal to current;
a plurality of multiplier circuits, wherein each of the plurality of multiplier circuits is configured to multiply a respective current imbalance signal by a duty cycle of a respective one of the plurality of DC-to-DC buck converter cells, and to generate a normalized current imbalance signal; and
a plurality of ON time generators each configured to activate a respective one of the plurality of converter cells for a predetermined time interval and to alter the predetermined time interval in accordance with a time integral of a respective normalized current imbalance signal;
each of the ON time generators comprising:
a source of predetermined current;

a timing capacitor configured to integrate a sum of the predetermined current and a respective current imbalance signal and generate a ramp voltage; and a comparator for terminating the altered predetermined time interval upon the ramp voltage exceeding a threshold.

* * * * *